US009807659B2

(12) United States Patent
Fu et al.

(10) Patent No.: US 9,807,659 B2
(45) Date of Patent: *Oct. 31, 2017

(54) SIGNALING DESIGN TO SUPPORT IN-DEVICE COEXISTENCE INTERFERENCE AVOIDANCE (71) Applicant: MEDIATEK INC., Hsinchu (TW)

(72) Inventors: I-Kang Fu, Taipei (TW); Yih-Shen Chen, Hsinchu (TW); William Plumb, Charlestown, MA (US); Per Johan Mikael Johansson, Kungsangen (SE)

(73) Assignee: MEDIATEK INC., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/753,840

(22) Filed: Jun. 29, 2015

(65) Prior Publication Data

US 2015/0334620 A1      Nov. 19, 2015

Related U.S. Application Data (63) Continuation of application No. 13/435,639, filed on Mar. 30, 2012, now Pat. No. 9,088,924.

(Continued)

(51) Int. Cl.
*H04Q 7/10* (2006.01)
*H04W 36/20* (2009.01)
(Continued)

(52) U.S. Cl.
CPC ........... *H04W 36/20* (2013.01); *H04W 24/10* (2013.01); *H04W 88/06* (2013.01)

(58) Field of Classification Search
CPC ..... H04W 16/14; H04W 72/12; H04W 36/00; H04W 36/0083; H04W 88/06;
(Continued)

(56) References Cited

U.S. PATENT DOCUMENTS

2007/0109973 A1    5/2007  Trachewsky ............... 370/252
2009/0219909 A1    9/2009  Ko et al. ..................... 370/343
(Continued)

FOREIGN PATENT DOCUMENTS

CN       1642044 A      7/2005
CN     101631293 A      2/2009
(Continued)

OTHER PUBLICATIONS

International Search Report and Written Opinion of International Search Authority for PCT/CN2012/073399 dated Jun. 28, 2012(11 pages).

(Continued)

*Primary Examiner* — Kathy Wang-Hurst
*Assistant Examiner* — Julio Perez
(74) *Attorney, Agent, or Firm* — Imperium Patent Works; Zheng Jin (57) ABSTRACT A method of implicit signaling to support In-Device coexistence interference avoidance is provided. A UE sends an IDC interference indication to an eNB. The indication indicates that a serving frequency becomes unusable due to a coexistence interference problem. The indication does not explicitly indicate a frequency index or a frequency location of the unusable serving frequency. The eNB determines the serving frequency as unusable in an implicit manner. The eNB also determines an implied unusable frequency region based on the received IDC indication. The implied unusable frequency region is between the serving frequency and the ISM band. In one advantageous aspect, the eNB configures a condition for the UE, such that the UE is refrained from sending IDC interference indications unless the condition is satisfied.

14 Claims, 4 Drawing Sheets

Related U.S. Application Data (60) Provisional application No. 61/470,711, filed on Apr. 1, 2011.

(51) Int. Cl.
*H04W 24/10* (2009.01)
*H04W 88/06* (2009.01)

(58) Field of Classification Search
CPC .... H04W 88/12; H04L 5/0204; H04L 1/0071; H04L 43/00; H04L 5/0053
USPC ....... 370/252, 328, 332, 329, 331, 312, 315, 370/311; 455/67.7, 88, 67.13, 436, 501
See application file for complete search history.

(56) References Cited

U.S. PATENT DOCUMENTS

| | | | |
|---|---|---|---|
| 2009/0279511 A1 | 11/2009 | Zhu | 370/336 |
| 2010/0061326 A1 | 3/2010 | Lee et al. | 370/329 |
| 2010/0178924 A1 | 7/2010 | Kashiwase | 455/438 |
| 2010/0265856 A1 | 10/2010 | Yang | 370/281 |
| 2012/0213162 A1* | 8/2012 | Koo | H04W 16/14 370/329 |
| 2012/0214489 A1* | 8/2012 | Koo | H04W 36/0083 455/436 |

FOREIGN PATENT DOCUMENTS

| | | |
|---|---|---|
| CN | 101411228 A | 4/2009 |
| CN | 101686553 A | 3/2010 |
| CN | 101982007 A | 2/2011 |
| WO | WO2005032187 A1 | 4/2005 |
| WO | WO2009137295 | 11/2009 |
| WO | WO2010025678 | 3/2010 |
| WO | WO2010025678 A1 | 3/2010 |
| WO | WO2010027208 | 3/2010 |

OTHER PUBLICATIONS

3GPP TR 36.816 v1.0.0 (Nov. 2010), 3rd Generation Partnership Project; Technical Specification Group Radio Access Networks; Evolved Universal Terrestrial Radio Access (E-UTRA); Study on Signaling and Procedure for Interference avoidance for In-Device Coexistence; (Release 10), Sections 4,5.
SIPO, Office Action for the CN patent application 201280000734.9 dated Jun. 12, 2014 (10 pages).
JPO, Office Action for the JP patent application 2013-558298 dated Jul. 9, 2014 (7 pages).
R2-105454 3GPP TSG RAN WG2#71bis, MediaTek, Clarification on Modes of Interference Avoidance for Each Potential Resolution Direction, Oct. 11-15, 2010, Xian, China (6 pages).
R2-105361 3GPP TSG-RAN WG2 Meeting #71bis, ZTE, Further Analysis on In-Device Coexistence Interference Avoidance Solutions, Oct. 11-15, 2010, Xi'an, China (8 pages).
EPO, Search Report for the EP patent application 12762742.0 dated Mar. 11, 2015 (7 pages).
R2-110446 3GPP TSG-RAN2 Meeting #72B; LG Electronics Inc.; Open Issue for the Indication; Dublin, Ireland dated Jan. 17-21, 2011 (2 pages).
R2-110243 3GPP TSG-RAN WG2 Meeting #72bis; ZTE; Considerations on the Detail Procedure for FDM Approach; Dublin, Ireland dated Jan. 17-21, 2011 (6 pages).
R2-095795 3GPP TSG-RAN WG2 #67bis; Ericsson et al.; SR Prohibit Timer; Miyazaki, Japan dated Oct. 12-16, 2009 (9 pages).
R2-110258 3GPP TSG-RAN WG2 Meeting #72bis; MediaTek; Trigger of UE Reporting for FDM Solution; Dublin, Ireland dated Jan. 17-21, 2010 (4 pages).
JPO, Office Action for the JP patent application 2015-083531 dated Jul. 6, 2016 (12 pages).
3GPP TSG-RAN WG2 Meeting #73 R2-111300, Pantech, Restrictions on reactive indications in FDM ICO, Taipei, Taiwan dated Feb. 21-25, 2011 (4 pages).
3GPP TSG-RAN WG2 Meeting #73 R2-111099, MediaTek, LTE DL Measurement for Trigger, Taipei, Taiwan dated Feb. 21-25, 2011 (4 pages).
3GPP TSG-RAN WG2 Meeting #73 R2-111251, CMCC et al., Discussion on indication of coexistence interference, Taipei, Taiwan dated Feb. 21-25, 2011 (3 pages).
3GPP TR 36.816 v1.0.0 (Nov. 2010), 3rd Generation Partnership Project; Technical Specification Group Radio Access Networks; Evolved Universal Terrestrial Radio Access (E-UTRA); Study on Signaling and Procedure for Interference avoidance for In-Device Coexistence; (Release 10).
3GPP TSG RAN WG2 #71 bis R2-105454, MediaTek, Clarification on Modes of Interference Avoidance for Each Potential Resolution Direction, Xian, China dated Oct. 1-15, 2010 (6 pages).

\* cited by examiner

SIGNALING DESIGN TO SUPPORT IN-DEVICE COEXISTENCE INTERFERENCE AVOIDANCE

CROSS REFERENCE TO RELATED APPLICATIONS

This application is a continuation, and claims priority under 35 U.S.C. §120 from nonprovisional U.S. patent application Ser. No. 13/435,639, entitled "SIGNALING DESIGN TO SUPPORT IN-DEVICE COEXISTENCE INTERFERENCE AVOIDANCE," filed on Mar. 30, 2012, the subject matter of which is incorporated herein by reference. Application Ser. No. 13/435,639, in turn, priority under 35 U.S.C. §119 from U.S. Provisional Application No. 61/470,711, entitled "Signaling Design to Support In-Device Coexistence Interference Avoidance," filed on Apr. 1, 2011, the subject matter of which is incorporated herein by reference.

TECHNICAL FIELD

The disclosed embodiments relate generally to wireless network communications, and, more particularly, to in-device coexistence interference avoidance.

BACKGROUND

Ubiquitous network access has been almost realized today. From network infrastructure point of view, different networks belong to different layers (e.g., distribution layer, cellular layer, hot spot layer, personal network layer, and fixed/wired layer) that provide different levels of coverage and connectivity to users. Because the coverage of a specific network may not be available everywhere, and because different networks may be optimized for different services, it is thus desirable that user devices support multiple radio access networks on the same device platform. As the demand for wireless communication continues to increase, wireless communication devices such as cellular telephones, personal digital assistants (PDAs), smart handheld devices, laptop computers, tablet computers, etc., are increasingly being equipped with multiple radio transceivers. A multiple radio terminal (MRT) may simultaneously include a Long-Term Evolution (LTE) or LTE-Advanced (LTE-A) radio, a Wireless Local Area Network (WLAN, e.g., WiFi) access radio, a Bluetooth (BT) radio, and a Global Navigation Satellite System (GNSS) radio.

Due to spectrum regulation, different technologies may operate in overlapping or adjacent radio spectrums. For example, LTE/LTE-A TDD mode often operates at 2.3-2.4 GHz, WiFi often operates at 2.400-2.483.5 GHz, and BT often operates at 2.402-2.480 GHz. Simultaneous operation of multiple radios co-located on the same physical device, therefore, can suffer significant degradation including significant coexistence interference between them because of the overlapping or adjacent radio spectrums. Due to physical proximity and radio power leakage, when the transmission of data for a first radio transceiver overlaps with the reception of data for a second radio transceiver in time domain, the second radio transceiver reception can suffer due to interference from the first radio transceiver transmission. Likewise, data transmission of the second radio transceiver can interfere with data reception of the first radio transceiver.

Various in-device coexistence (IDC) interference mitigation solutions have been proposed. For example, an UE may request network assistance to mitigate IDC interference via frequency division multiplexing (FDM), time division multiplexing (TDM), and/or power management principles. While the various FDM, TDM, and power management solutions may solve some of the IDC interference problems, there are still remaining issues. For example, the UE will report unusable frequencies to eNB for FDM solutions. However, it is not yet clear that how the unusable frequencies are judged and in which format it will be reported to eNB. It is also not clear that how the unusable frequencies are reported. Can the report of unusable frequencies be used along with reactive or proactive trigger? Can the report of unusable frequency resolve ping-pong effect? In addition, how does the UE detect IDC interference problem, and can such detection be managed by eNB? A systematic approach is necessary to resolve above problems together.

SUMMARY

A method of implicit signaling to support In-Device coexistence interference avoidance is provided. A UE sends an IDC interference indication to an eNB. The indication indicates that a serving frequency becomes unusable due to a coexistence interference problem. The indication does not explicitly indicate a frequency index or a frequency location of the unusable serving frequency. The eNB determines the serving frequency as unusable in an implicit manner. The eNB also determines an implied unusable frequency region based on the received IDC indication. The implied unusable frequency region is between the serving frequency and the ISM band. Based on the knowledge of unusable frequency and implied unusable frequency region, the eNB can make decision for coexistence interference avoidance without high signaling overhead.

In one embodiment, the UE sends an IDC interference relief indication to the eNB. The relief indication indicates that the serving frequency becomes usable. The relief indication does not explicitly indicate a frequency index or a frequency location of the usable serving frequency. The eNB will treat the serving frequency as usable in implicit manner after receiving the IDC relief indication. The eNB will also treat the frequency channels that are farther away from the ISM band than the serving frequency as usable frequency channels.

In one advantageous aspect, the eNB configures a condition for the UE, such that the UE is refrained from sending IDC interference indications unless the condition is satisfied to protect the network from frequent and unreliable IDC problem reporting. In a first example, the condition is satisfied if a prohibit timer expires. In a second example, the condition is satisfied if a Physical Downlink Control Channel (PDCCH) decoding rate is below a threshold value. In a third example, the condition is satisfied if a downlink HARQ error rate is above a threshold value. In a fourth example, the condition is satisfied if the eNB informs the UE that the eNB is capable of supporting in-device coexistence interference avoidance feature.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
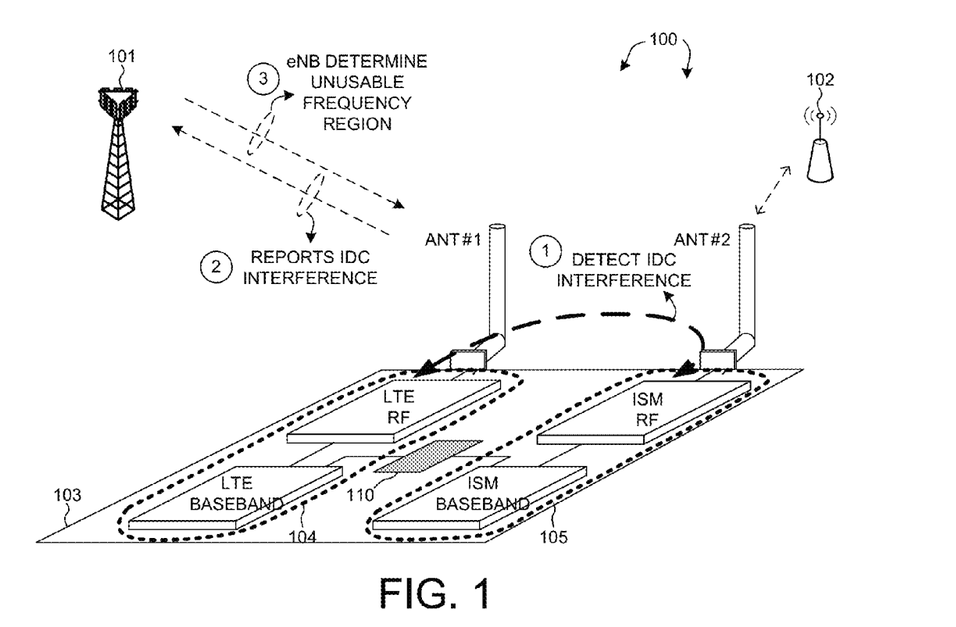
FIG. 1 illustrates a user equipment having multiple radio transceivers in a wireless communication system in accordance with one novel aspect.

FIG. 1 illustrates a user equipment (UE) having multiple radio transceivers in a wireless communication system 100 in accordance with one novel aspect. Wireless communication system 100 comprises an LTE base station eNB 101, a WiFi access point AP 102, and a user equipment UE 103. Wireless communication system 100 provides various network access services for UE 103 via different radio access technologies. For example, eNB 101 provides cellular radio network (e.g., a 3GPP Long-Term Evolution (LTE) system) access, while AP 102 provides local coverage for Wireless Local Area Network (WLAN) access. To better facilitate the various radio access technologies, UE 103 is a multi-radio terminal (MRT) that is equipped with an LTE radio transceiver 104 and an ISM (Industrial, Scientific and Medical) radio transceiver 105 co-located in the same device platform (i.e., In-Device).

Due to radio spectrum regulation, different radio access technologies may operate in overlapping or adjacent radio spectrums. For example, the transmission of the LTE radio transceiver can interfere with the reception of the ISM radio transceiver. Likewise, the transmission of the ISM radio transceiver can interfere with the reception of the LTE radio transceiver. How to effectively mitigate coexistence interference is a challenging problem for co-located radio transceivers operating in overlapping or adjacent frequency channels. The problem is more severe around the 2.4 GHz ISM radio frequency band. The 2.4 GHz ISM band (e.g., ranges from 2400-2483.5 MHz) is used by both fourteen WiFi channels and seventy-nine Bluetooth channels. In addition to the crowded ISM band, 3GPP LTE Band 40 (e.g., TDD) ranges from 2300-2400 MHz, LTE Band 41 (e.g., TDD) ranges from 2496-2690 MHz, and LTE Band 7 (e.g., UL FDD) ranges from 2500-2570 MHz, all are very close to the 2.4 GHz ISM radio frequency band.

In one novel aspect, a method of implicit indication for unusable/usable frequency is provided such that upon detection and indication of in-device coexistence (IDC) interference, effective frequency division multiplexing (FDM) solutions may be applied for IDC interference avoidance. In step 1, the LTE radio module of UE 103 detects IDC interference from the co-located ISM radio module and triggers the report of IDC problem (e.g., via a central control entity 110 for control info). More specifically, the LTE radio module detects that the serving frequency becomes unusable due to IDC interference. In step 2, the LTE radio module of UE 103 reports the detected IDC interference problem to its serving eNB 101. The reporting message, without the content explicitly associated with the serving frequency index or its frequency location, implicitly indicates to eNB 101 that the serving frequency becomes unusable. In step 3, based on the reporting message, eNB 101 determines that an unusable frequency region between the serving frequency and the ISM band. eNB 101 will treat all the frequencies in the unusable frequency region be unusable when making IDC interference avoidance decisions.

Figure 2:
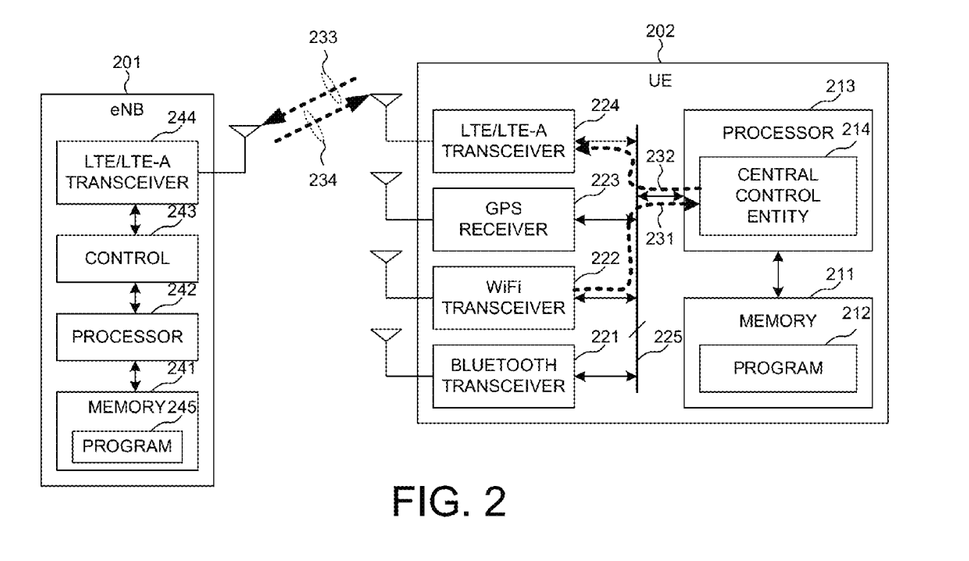
FIG. 2 is a simplified block diagram of an eNB and a user equipment in accordance with one novel aspect.

FIG. 2 is a simplified block diagram of a base station eNB 201 and a user equipment UE 202 in accordance with one novel aspect. UE 202 comprises memory 212, a processor 213 having a central control entity 214, an LTE/LTE-A transceiver 224, a GPS receiver 223, a WiFi transceiver 222, a Bluetooth transceiver 221, and bus 225. Similarly, eNB 201 comprises memory 241, a processor 242, a control entity 243, and an LTE/LTE-A transceiver 244. The different entities are function modules that can be implemented by software, firmware, hardware, or any combination thereof. The function modules, when executed by the processors 211 and 241 (e.g., via executing program codes 212 and 245), allow UE 202 and eNB 201 to perform various functions accordingly.

In the example of FIG. 2, central control entity 214 is a logical entity physically implemented within processor 213, which is also used for device application processing for UE 202. Central control entity 214 is connected to various transceivers within UE 202, and communicates with the various transceivers via bus 225. For example, WiFi transceiver 222 transmits WiFi signal information and/or WiFi traffic and scheduling information to central control entity 214 (e.g., depicted by a thick dotted line 231). Based on the received WiFi information, central control entity 214 determines control information and transmits the control information to LTE/LTE-A transceiver 224 (e.g., depicted by a thick dotted line 232). In one embodiment, LTE transceiver 224 detects IDC interference problem and indicates such problem to its serving base station eNB 201 (e.g., depicted by a thick dotted line 233). Based on the IDC problem indication, eNB 201 makes certain decisions (e.g., handover) to mitigate the IDC interference (e.g., depicted by a thick dotted line 234). Although the central control entity is implemented within processor 213 in the example of FIG. 2, it can be implemented within other modules such as the LTE transceiver, or be implemented as an independent and separate function module.

Figure 3:
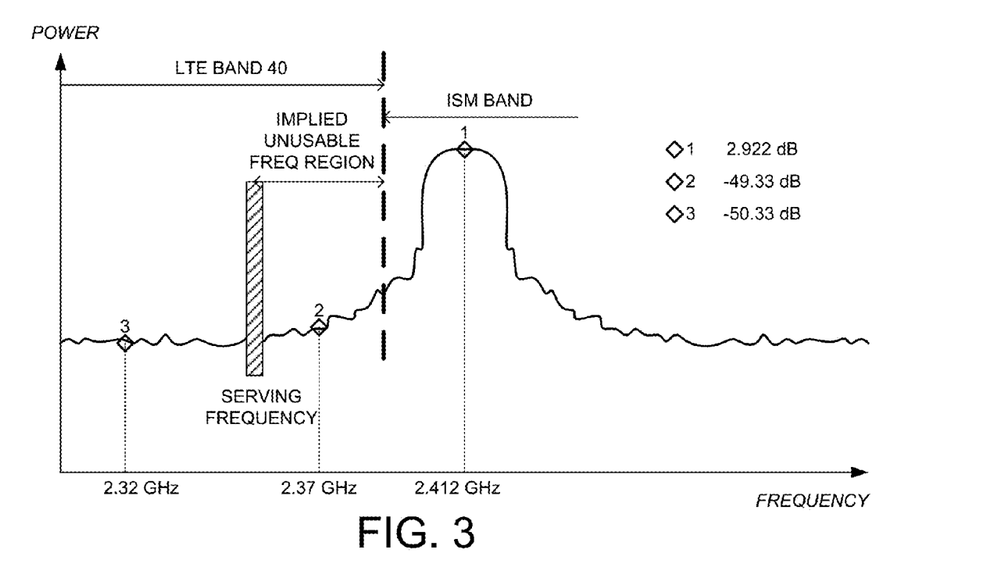
FIG. 3 illustrates an ISM radio signal and implicitly indicating unusable serving frequency in accordance with one novel aspect.

FIG. 3 illustrates an ISM radio signal and implicitly indicating unusable serving frequency in accordance with one novel aspect. For IDC interference, when the transmit signal by a WiFi/BT transceiver is very close to the receive signal for the co-located LTE transceiver, the WiFi/BT signal is the aggressor and the LTE signal is the victim. On the other hand, when the transmit signal by the LTE transceiver is very close to the receive signal for the co-located WiFi/BT transceiver, the LTE signal is the aggressor and the WiFi/BT signal is the victim. As a general observation, the coexistence interference from the aggressor to the victim in adjacent frequency channels is generally decreasing when the frequency separation is enlarged.

In the example of FIG. 3, the WiFi/BT radio signal in the ISM band is the aggressor and the LTE signal in LTE Band 40 is the victim. The WiFi signal has a first power amplitude of 2.922 dB at central frequency location 2.412 GHz (e.g., at marker 1), a second power amplitude of −49.33 dB at frequency location 2.37 GHz (e.g., at marker 2), and a third power amplitude of −50.33 dB at frequency location 2.32 dB (e.g., at marker 3). Because the WiFi signal is much stronger at its central frequency location and significantly decreases as the frequency decreases (or increases in the other direction), the coexistence interference to the LTE signal would also decrease when the LTE serving frequency is farther away from the WiFi central frequency. Similarly, the coexistence interference to the LTE signal would increase when the LTE serving frequency is closer to the WiFi central frequency. As a result, if a UE has an LTE serving frequency, and the UE detects that the serving frequency becomes unusable due to coexistence interference from the ISM band, then the UE is able to determine that any other frequency channels located between the serving frequency and the ISM band would also be unusable because the coexistence interference would be stronger as compared to the serving frequency. The frequency region between the LTE serving frequency and the ISM band is referred to as "implied unusable frequency region". Based on this specific characteristic of IDC interference, the UE can more efficiently report IDC interference problem via implicit signaling.

Figure 4:
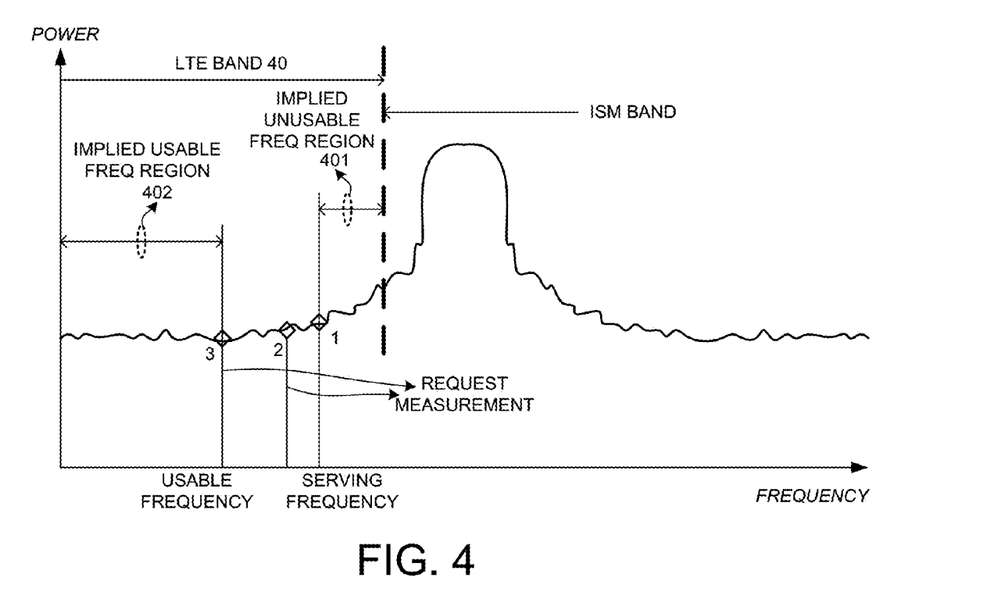
FIG. 4 illustrates a method of implicit signaling design for IDC interference avoidance in accordance with one novel aspect.

FIG. 4 illustrates a method of implicit signaling design for IDC interference avoidance in accordance with one novel aspect. Assume that the condition to judge unusable frequency is in principle similar as the condition to trigger UE reporting of coexistence problem. When a UE detects that its LTE serving frequency is unusable due to IDC interference from the ISM band traffic, the UE reports the detected IDC interference problem to its serving eNB. The IDC interference problem may be reported explicitly or implicitly. For explicit reporting, the UE explicitly identify a list of frequencies that are unusable. It is a straightforward reporting method but has high reporting overhead.

In one advantageous aspect, the UE applies implicit reporting method. First, the UE reports an indication of a detected coexistence problem to the eNB without explicit content to describe whether the serving frequency is unusable. The eNB, however, will treat the serving frequency (e.g., at marker 1 in FIG. 4) unusable after receiving UE reporting of coexistence interference problem. Second, the UE reports an indication of the detected coexistence problem to the eNB without explicit content to describe whether the frequency channels between the serving frequency and the ISM band are unusable. The eNB, however, will treat the frequency region (e.g., region 401 in FIG. 4) between the serving frequency and the ISM band unusable after receiving UE reporting of coexistence interference problem. This implicit reporting method saves signaling overhead. The indication may be transmitted by sending a dummy Channel Quality Indicator (CQI) value, dummy Reference Signal Received Quality (RSRQ) measurement report, or by a Radio Resource Control (RRC) message in UL control channel. For example, the UE may report the lowest CQI or the lowest RSRQ to implicitly indicate the IDC interference problem. In an extension of the implicit reporting method, the UE only reports the boundary of the implied unusable frequency region, and the eNB treat all the frequency channels between that boundary and the ISM band unusable.

In the example of FIG. 4, the UE also reports the indication of the detected coexistence problem to the eNB with another embedded indication to indicate whether there is unusable or usable frequency channel outside the implied unusable frequency region 401 between the serving frequency and ISM band. For example, the UE may use one single bit to indicate whether there is usable frequency channel outside the implied unusable frequency region. If there is no usable frequency channel in the entire LTE Band 40, then the eNB may have no choice other than to activate TDM-based coexistence avoidance mechanism. On the other hand, if there is usable frequency in outside the implied unusable frequency region, then the eNB may consider applying FDM-based coexistence avoidance mechanism.

In one example, the eNB may select some of the frequencies (e.g., at marker 2 and marker 3) outside the implied unusable frequency region, and then request the UE to perform measurements over those selected frequencies. The eNB can then determine suitable frequency for handover operation to mitigate the coexistence interference. For instance, if the measurement result indicates that the frequency channel at marker 3 is usable, then the eNB can determine an implied usable frequency region 402 that is farther away from the ISM band than the frequency channel at marker 3. As a result, the eNB can select any frequency channel within the implied usable frequency region 402 for handover operation to mitigate IDC interference. In another example, the eNB is more likely to select a usable frequency channel that is farther away from the ISM band for handover operation. For instance, the eNB starts from the frequency channel that is farthest away from the ISM band, and selects frequency channel for handover operation as long as available.

In addition to implicitly indicating to eNB that a UE serving frequency is unusable, the UE may also send an indication to eNB when the serving frequency becomes usable. The indication may be transmitted by sending a dummy CQI value, a dummy RSRQ measurement report, or by a RRC message via UL control channel. For example, the UE may report the highest CQI or the highest RSRQ to implicitly indicate the relief from IDC interference problem. First, the UE indicates that the frequency channels between the serving frequency and the ISM band become usable by sending an indication of the relief of coexistence problem to the eNB without the content explicitly associated with the serving frequency index or frequency location. The eNB, however, will treat the frequency region between the serving frequency and the ISM band as usable in implicit manner after receiving the IDC relief indication. Second, the UE indicates that the serving frequency becomes usable by sending an indication of the relief of coexistence problem to the eNB without the content explicitly associated with the serving frequency index or frequency location. The eNB, however, will treat the serving frequency as usable in implicit manner after receiving the IDC relief indication. The eNB will also treat the frequency channels that are farther away from the ISM band than the serving frequency as usable frequency channels. Furthermore, the UE can indicate if there is unusable frequency between the serving frequency and the ISM band by an indication not explicitly associated with specific frequency index or frequency location. Based on this further indication or eNB judgment, if there is unusable frequency (e.g., indicated by one single bit), then the eNB can request the UE to perform measurements over at least some of the frequency channels between the serving frequency and the ISM band.

How to configure UE measurement pattern is another important aspect in handling IDC interference problems. UE measurement is not only for normal measurement reporting to eNB, but also is closely related to how to judge whether a frequency is usable/unusable, as well as when to trigger the reporting of IDC interference problems. With multiple co-located radio modules on the same device platform, it becomes more important for the UE to perform measurements at the right time. For example, if the LTE radio signal is interfered by the ISM radio signal, then the UE should perform measurement during the period when ISM is expected to be actively transmitting so that the measurement result is more meaningful in terms of more accurately reflecting the IDC interference problem. In LTE systems, because UE measurement patterns need to be configured by the network, it is thus helpful if the network has some knowledge of the ISM traffic information before configuring any measurement pattern for UE.

Figure 5:
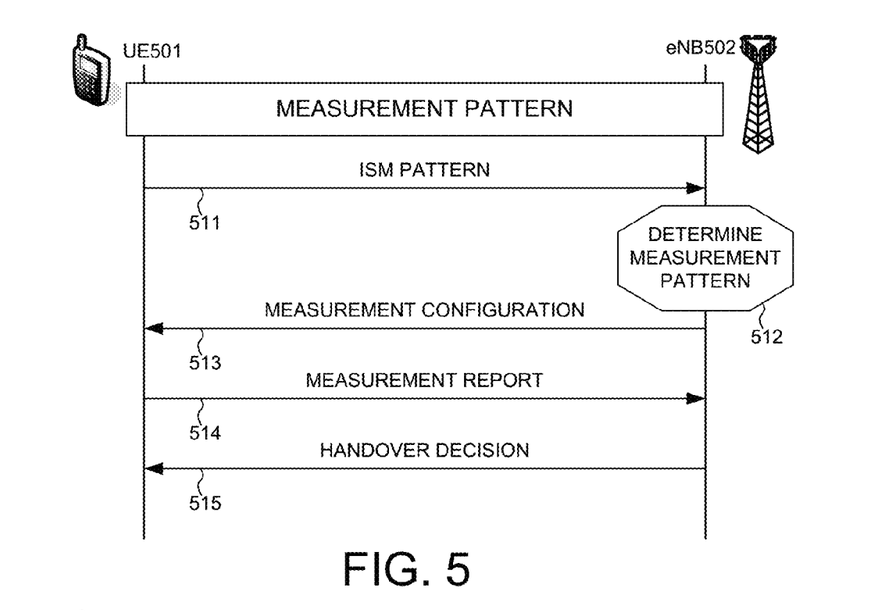
FIG. 5 illustrates a method of configuring a measurement pattern in accordance with one novel aspect.

FIG. 5 illustrates a method of configuring a measurement pattern in an LTE system 500 in accordance with one novel aspect. LTE system 500 comprises a UE 501 and an eNB 502. UE 501 is equipped with an LTE radio module and a co-located ISM radio module. In step 511, UE 501 reports its ISM traffic information to eNB 502. In step 512, eNB 502 determines a measurement pattern at the period where ISM is expected to be actively transmitting based on the reported ISM traffic information. In one example, eNB 502 could customize a measurement pattern based on the reported ISM traffic info. In another example, eNB 502 could select one of the pre-defined measurement patterns based on the reported ISM traffic info. The selected pattern could be the one that leads to most time overlap between the measurement gap and the ISM TX period. In step 513, eNB 502 sends the determined measurement configuration to UE 501. In step 514, UE 501 sends measurement result to eNB 502. UE 501 may also trigger the reporting of coexistence interference. UE 501 may implicitly indicate unusable serving frequency and unusable frequency region to eNB 502. Finally, in step 515, eNB 502 makes handover decision to mitigate IDC interference. The above illustrated measurement configuration mechanism may not always work due to signaling overhead. Different alternatives may be considered.

Figure 6:
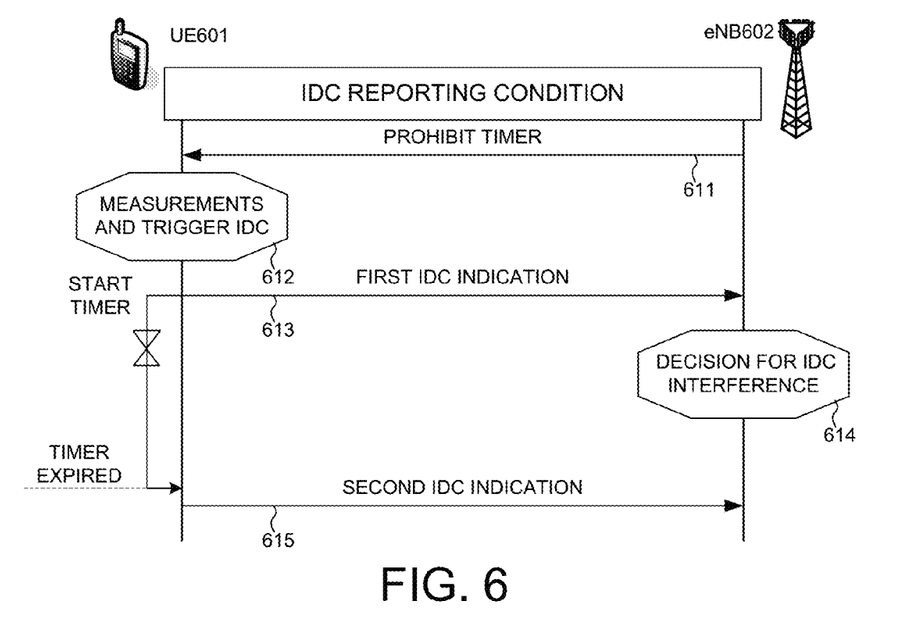
FIG. 6 illustrates a method of providing a prohibit timer in accordance with one novel aspect.

FIG. 6 illustrates a first alternative of measurement configuration in an LTE system 600 in accordance with one novel aspect. LTE system 600 comprises a UE 601 and an eNB 602. In step 611, eNB 602 configures a prohibit timer to UE 601 so that UE 601 refrains from making unnecessary IDC problem reporting. Note that the eNB may configure this timer to UE very early, e.g., when UE just enters its coverage. The configuration may be done by UE specific message or broadcast message. In step 612, UE 601 performs measurements of LTE radio signals and triggers IDC problem reporting. Note that UE 601 performs the measurements without being configured with a specific measurement pattern based on the real ISM traffic information. In step 613, UE 601 sends a first IDC indication to eNB 602. The IDC indication may implicitly indicates unusable serving frequency and unusable frequency region to eNB 602 due to coexistence interference. At the same time, UE 601 also starts the prohibit timer. In step 614, eNB 602 make certain decisions to mitigate the coexistence interference problem based on the received IDC indication. Before the prohibit timer expires, UE 601 is refrained from sending a second IDC indication to eNB 602. In step 615, after the prohibit timer expiration, UE 601 sends a second IDC indication to eNB 602 if UE 601 still experiences coexistence interference.

The benefit of this method is that the measurement detail is up to UE implementation. Because of signaling overhead, eNB 602 has no idea of the exact measurement pattern, so eNB 602 can configure a timer to prevent unnecessary IDC reporting to protect the network from frequent and inaccurate IDC reporting from the UE. In addition to the prohibit timer mechanism, other criteria associated with system performance may be used as a condition to limit UE measurement implementation. In a first example, the UE cannot indicate IDC problem if a Physical Downlink Control Channel (PDCCH) decoding rate is above a threshold value. In a second example, the UE cannot indicate IDC problem if a downlink HARQ error rate is below a threshold value. In a third example, the condition is satisfied if the eNB informs the UE that the eNB is capable of supporting in-device coexistence interference avoidance feature. For example, if the eNB configures a prohibit timer to be infinite, it may imply that the eNB does not support IDC feature at all. So this configuration actually means whether eNB can support IDC feature or not.

Another alternative is that the eNB simply configures a set of measurement periods for IDC measurement. The benefit of this method is having a simplified measurement period configuration regardless of the real ISM traffic. The measurement configuration may be determined by L3 filtering parameters. If the measurement report is to reuse or modify current RRM measurement report procedure, it is good to consider the filtering parameters. If eNB already has some pre-knowledge of the IDC operation (e.g., beacon periodicity, WiFi offload from CN), it is possible that eNB properly configures a moderate measurement period.

If an LTE UE is also equipped with a Global Navigation Satellite System (GNSS) radio for GPS service, the GNSS reception may be interfered by the co-located LTE transmission. In one advantageous aspect, the UE obtains TDM coexistence interference avoidance information from its serving eNB. For example, the eNB informs the UE when it may schedule UE to transmit uplink signal. The UE then informs its GNSS receiver the time period that the UE may transmit uplink signal. Based on this information, the GNSS receiver may choose to drop the decoding results over the timer period when the in-device LTE transceiver may transmit uplink signal. This is because the decoding result over the interfered signals may not be accurate and would cause errors on the positioning results. This time period may be based on the TDM traffic pattern information obtained from the eNB. Alternatively, this time period may be based on real-time UE internal signaling on the LTE transmission status.

Figure 7:
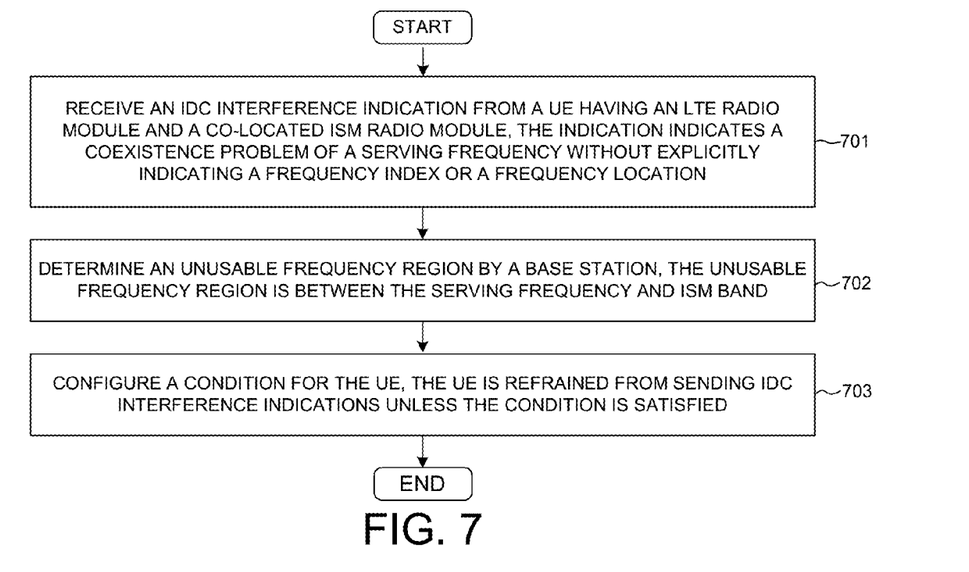
FIG. 7 is a flow chart of a method of IDC interference avoidance from eNB perspective.

FIG. 7 is a flow chart of a method of IDC interference avoidance from eNB perspective. In step 701, an eNB receives an IDC interference indication from a UE having an LTE radio module and a co-located ISM radio module. The indication indicates that a serving frequency becomes unusable due to a coexistence interference problem. The indication does not explicitly indicate a frequency index or a frequency location of the unusable serving frequency. In step 702, the eNB determines an implied unusable frequency region based on the received IDC indication. The implied unusable frequency region is between the serving frequency and the ISM band. In step 703, the eNB configures a condition for the UE, such that the UE is refrained from sending IDC interference indications unless the condition is satisfied. Note that this step 703 is independent from the previous two steps 701-702. Typically, the eNB configures this condition before the UE possibly make any IDC interference indication.

Figure 8:
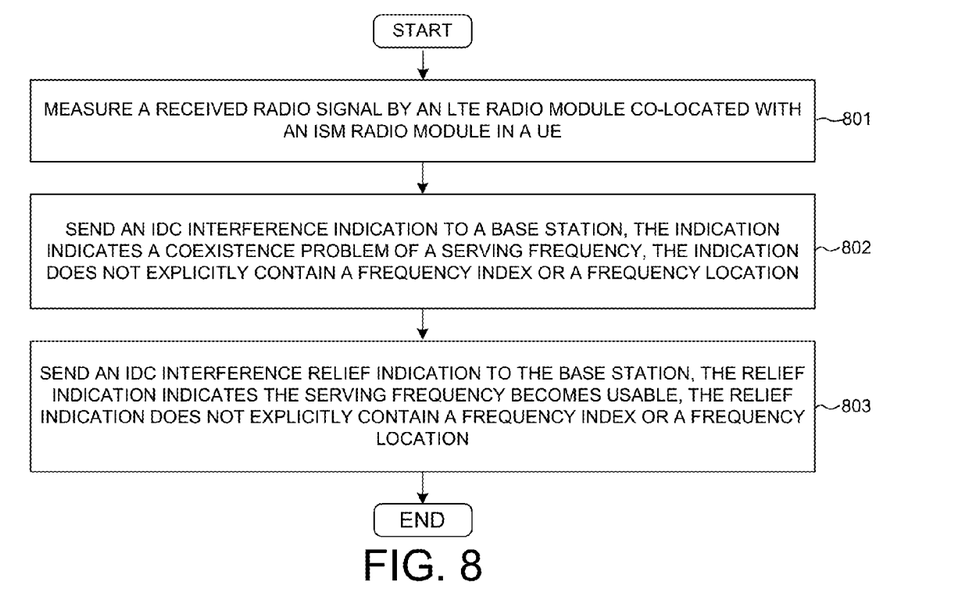
FIG. 8 is a flow chart of a method of IDC interference avoidance from UE perspective.

FIG. 8 is a flow chart of a method of IDC interference avoidance from UE perspective. In step 801, a UE measures a received radio signal using an LTE radio module that is co-located with an ISM radio module. In step 802, the UE sends an IDC interference indication to an eNB. The indication indicates that a serving frequency becomes unusable due to a coexistence interference problem. The indication does not explicitly indicate a frequency index or a frequency location of the unusable serving frequency. In step 803, the UE sends an IDC interference relief indication to the eNB. The relief indication indicates that the serving frequency becomes usable. The relief indication does not explicitly indicate a frequency index or a frequency location of the usable serving frequency.

Although the present invention has been described in connection with certain specific embodiments for instructional purposes, the present invention is not limited thereto. For example, although an LTE-advanced mobile communication system is exemplified to describe the present invention, the present invention can be similarly applied to other mobile communication systems, such as Time Division Synchronous Code Division Multiple Access (TD-SCDMA) systems. Accordingly, various modifications, adaptations, and combinations of various features of the described embodiments can be practiced without departing from the scope of the invention as set forth in the claims.

What is claimed is:

1. A method, comprising:
    measuring a received radio signal by an LTE radio module co-located with an Industrial, Scientific and Medical (ISM) radio module in a user equipment (UE);
    sending an in-device coexistence (IDC) interference indication and an ISM traffic pattern to a base station, wherein the IDC interference indication indicates an implied unusable frequency region due to a coexistence problem between the LTE radio module and the co-located ISM radio module;
    receiving a measurement configuration with a measurement pattern from the base station, wherein the UE performs measurements at a period when ISM traffic is active;
    sending a second embedded indication of whether there is a possible usable frequency outside the implied unusable frequency region, wherein the second embedded indication is determined based on measurement results associated with the measurement pattern; and
    receiving a usable frequency channel for handover if the second embedded indication indicates the possible usable frequency, wherein the usable frequency channel is located in LTE band excluding the implied unusable frequency region.

2. The method of claim 1, wherein the IDC interference indication implicitly indicates that a serving frequency of the UE is unusable.

3. The method of claim 1, wherein the IDC interference indication implicitly indicates that a frequency region between a serving frequency and ISM band is unusable.

4. The method of claim 1, further comprising:
    sending an IDC interference relief indication to the base station, wherein the relief indication indicates a serving frequency becomes usable, and wherein the relief indication does not explicitly contain a frequency index or a frequency location.

5. The method of claim 1, further comprising:
    receiving a prohibit timer from the base station, wherein the UE is prohibited from reporting two consecutive IDC interference indications within the timer period.

6. The method of claim 1, wherein the UE does not send the IDC coexistence indication when a Physical Downlink Control Channel (PDCCH) decoding rate is above a threshold value.

7. The method of claim 1, wherein the UE does not send the IDC coexistence indication when a downlink HARQ error rate is below a threshold value.

8. A user equipment (UE), comprising:
    a measurement module that measures a radio signal received by an LTE radio module co-located with an Industrial, Scientific and Medical (ISM) radio module in the UE, wherein the UE receives a measurement configuration with a measurement pattern from the base station, and wherein the UE performs measurements at a period when ISM traffic is active;
    a transmitter that sends an in-device coexistence (IDC) interference indication and an ISM traffic pattern to a base station, wherein the IDC interference indication indicates an implied unusable frequency region due to a coexistence problem between the LTE radio module and the co-located ISM radio module, wherein the transmitter also sends a second embedded indication of whether there is a possible usable frequency outside the implied unusable frequency region, and wherein the second embedded indication is determined based on measurement results associated with the measurement pattern; and
    a receiver that receives a usable frequency channel for handover if the second embedded indication indicates the possible usable frequency, wherein the usable frequency channel is located in LTE band excluding the implied unusable frequency region.

9. The UE of claim 8, wherein the IDC interference indication implicitly indicates that a serving frequency of the UE is unusable.

10. The UE of claim 8, wherein the IDC interference indication implicitly indicates that a frequency region between a serving frequency and ISM band is unusable.

11. The UE of claim 8, wherein the UE sends an IDC interference relief indication to the base station, wherein the relief indication indicates a serving frequency becomes usable, and wherein the relief indication does not explicitly contain a frequency index or a frequency location.

12. The UE of claim 8, wherein the UE receives a prohibit timer from the base station, wherein the UE is prohibited from reporting two consecutive IDC interference indications within the timer period.

13. The UE of claim 8, wherein the UE does not send the IDC coexistence indication when a Physical Downlink Control Channel (PDCCH) decoding rate is above a threshold value.

14. The UE of claim 8, wherein the UE does not send the IDC coexistence indication when a downlink HARQ error rate is below a threshold value.

* * * * *